United States Patent [19]

Gibson, Jr, et al.

[11] Patent Number: 4,850,934
[45] Date of Patent: Jul. 25, 1989

[54] STABILIZED TENSIONING DEVICE FOR FLEXIBLE DRIVE ELEMENT

[75] Inventors: Bernard P. Gibson, Jr., Yakima; Howard C. Merchant, Bothell, both of Wash.

[73] Assignee: Moxee Innovations Corporation, Moxee, Wash.

[21] Appl. No.: 201,590

[22] Filed: Jun. 2, 1988

[51] Int. Cl.⁴ ............................................. F16H 7/08
[52] U.S. Cl. ..................................... 474/111; 474/140
[58] Field of Search ............... 474/101, 109, 111, 134, 474/136, 137, 140

[56] References Cited

U.S. PATENT DOCUMENTS

| | | | |
|---|---|---|---|
| 716,520 | 12/1902 | Cole | 474/138 |
| 3,069,920 | 12/1962 | Cole | 474/111 |
| 3,115,046 | 12/1964 | Bliss et al. | 474/111 |
| 3,148,555 | 9/1964 | Peras | 474/111 |
| 3,172,650 | 3/1965 | Jarret et al. | 267/113 |
| 3,370,476 | 2/1968 | Hill et al. | 474/111 |
| 3,455,178 | 7/1969 | Ruoff et al. | 474/111 |
| 3,514,144 | 5/1970 | Alderfer | 267/113 |
| 3,575,058 | 4/1971 | Kraus | 474/134 X |
| 3,606,296 | 9/1971 | Chassagne | 267/113 |
| 3,926,063 | 12/1975 | Mayfield | 474/132 |
| 3,941,006 | 3/1976 | Brodesser | 474/134 X |
| 3,964,331 | 6/1976 | Oldfield | 474/111 |
| 4,068,535 | 1/1978 | Sheets | 474/137 X |
| 4,530,681 | 7/1985 | Kurata et al. | 474/111 |
| 4,615,096 | 10/1986 | Foster | 474/111 X |

Primary Examiner—Thuy M. Bui
Attorney, Agent, or Firm—Christensen, O'Connor, Johnson & Kindness

[57] ABSTRACT

A free-floating tensioning device having motion damping capabilities and gyroscopic action stabilizing capabilities for use in a drive system having a flexible drive element is disclosed. The tensioning device includes a tensioning assembly along with a damping member and/or a stabilizing member. The tensioning assembly has first and second tensioning members, each having a contact surface that contacts the drive elements, and a positioning component for securing the tensioning members a selected distance away from one another in order to apply a suitable tensioning force to the drive element. The damping member is connected to the tensioning assembly and is suitable for damping the vibration and oscillation of the tensioning device during operation. The damping member includes a damping material. The stabilizing member is connected to the positioning component and produces a stabilizing torque that is substantially equal and opposite to the gyroscopic torque created by the tensioning members during operation. One preferred embodiment of the stabilizing member is a counterrotating member having a counterrotating contact surface. The rotation of the counterrotating member is driven by contact of the counterrotating contact surface with the contact surface of a tensioning member or with a surface of the drive element. The damping member is suitable for use with a tensioning device having tensioning members with contact surfaces that are fixed in relation to the respective tensioning members. The damping member and the stabilizing member are suitable for use with a tensioning device having tensioning members with contact surfaces that are rotatable about axes which are generally parallel to one another.

22 Claims, 6 Drawing Sheets

STABILIZED TENSIONING DEVICE FOR FLEXIBLE DRIVE ELEMENT

FIELD OF THE INVENTION

The present invention relates to a tensioning device for a drive system that includes a flexible drive element such as a drive chain or drive belt and, more particularly, to a tensioning device including motion damping and gyroscopic stabilizing elements for stabilizing the operating conditions of the tensioning device.

BACKGROUND OF THE INVENTION

The present invention is adapted for use with a conventional drive system in which a pair of drive sprockets are connected by a flexible drive element such as a drive chain. It is well known that the proper functioning of such a drive system and the operating life of the drive element can be significantly enhanced by maintaining the tension on the two drive element runs between the sprockets such that significant slack does not occur in either run. Tensioning devices of various forms have been developed and used for controlling the tension on the drive element runs during operation. Tensioning devicec can be either mounted within the same housing in which the drive sprockets are mounted, or can be free-floating on the drive element runs. The majority of prior tensioning devices have been adapted for specific drive system applications, resulting in the tensioning devices generally being mounted or secured to a housing or support that is fixed with respect to the sprocket axles.

Tensioning devices are especially useful for tensioning a drive element used in a fixed-center drive system. In such a system, the distance between the shafts upon which the drive sprockets are mounted are not adjustable. Thus, to mount the drive element, it is necessary either to cut the drive element and reconnect the ends after threading the drive element over the pulleys or to provide a belt that is long enough to be looped over the pulleys. In the latter case, the drive element will be slack between the pulleys. A tensioning device mounted around the drive element runs pinches the runs together to take up the slack.

In a system in which the tensioning device is fixed with respect to the sprockets, the drive system housing or support, rather than the tensioning device itself, acts to stabilize motions of the drive element runs that are not parallel to the motion of the drive element during normal operation. No such stabilizing force is present in drive systems utilizing a free-floating tensioning device.

An example of a free-floating tensioning device is presented in U.S. Pat. No. 4,662,862, issued to Matson et al. The tensioning device disclosed therein includes two tensioning members mounted on a flexible drive element such that the runs of the drive element are situated between and contact the tensioning members. The positioning of the tensioning members relative to one another is adjustable to thereby adjust the tension on the drive element runs. In such a system, the tensioning device is the only element other than the drive sprockets exerting force on the drive element runs.

SUMMARY OF THE INVENTION

The tensioning members of a free-floating tensioning device include contact surfaces that contact the drive element. There are two basic types of contact surfaces, those which are fixed in relation to the tensioning members, and those which rotate about an axis which is fixed in relation to the tensioning members. The rotation of the latter type of tensioning members is usually driven by contact between the drive element and the contact surfaces.

Free-floating tensioning devices with fixed surfaces as well as those with rotating contact surfaces are subject to vibration and oscillation of the tensioning device during operation. During the start up and continued operation of a drive system, these various disruptive motions are caused by slight perturbations of motion in any of the six directions defining an object in space. The motions can be caused by belt irregularities, machine vibrations or simply the variable operating loads placed on the belt during nonuniform operations, e.g., sawing or drilling. An alteration to the tension between the drive element runs caused by the vibration and/or oscillation of the tensioning device may occur. Alteration to the drive element run tension may cause improper connections between the drive sprockets and the flexible drive element to occur that will disrupt the operation of the drive system.

In free-floating tensioning devices including tensioning members with rotatable contact surfaces, each tensioning member is associated with an angular velocity and a mass moment of inertia when the tensioning device is in operation. Thus, each tensioning member is associated with a moment of momentum vector which may affect the tensioning device when the operation of the device is somewhat disrupted. The surfaces of each of the tensioning members are rotated in the same direction due to contact with the drive element runs. The sum of the moments generated by the gyroscopic action of each tensioning member are additive and result in a torque acting on the device. Additionally, the device is subject to a torque from the interaction of the device with the d rive element.

A free-floating tensioning including tensioning members with rotating contact surfaces is thus subject to gyroscopic action if the motion of the tensioning device is perturbed in any direction that is not parallel to the direction of motion of the drive element. Through this gyrocopic action, the roll of tensioning device about the drive element runs is coupled with the twist or yaw of the tensioning device about an axis normal to the direction of the drive element runs. The subsequent gyroscopic torque causes a metastable condition in the operation of the device.

One object of the present invention is to provide a stable, free-floating tensioning device. The tensioning device of the present invention is adopted for use with a drive system having a flexible drive element extending between sprockets, pulleys or the like. The tensioning device has first and second tensioning members having contact surfaces, and a positioning element for securing the first and second tensioning members a selected distance away from one another. The positioning element positions the first and second tensioning members such that the members are adjustably spaced apart from and facing one another. The tensioning device also includes a gyroscopic stabilizing member, a damping means, or both. In tensioning devices having tensioning members with rotating contact surfaces, a gyroscopic stabilizing member is included to counter the gyroscopic torque generated by the perturbation of device. The damping means damps vibration and oscillation of the tensioning device in all types of tensioning devices.

In accordance with one aspect of the present invention, the gyroscopic stabilizing member include rotating contact surface. The stabilizing member is mounted between the runs of the flexible drive element and contacts the runs with the contact surface such that the stabilizing member rotates in the direction opposite of the rotation of the first and second tensioning members during operation. The gyroscopic stabilizing member is subject to the same motions as the tensioning members. Thus, when the device is subject to motions that are not parallel to the direction of the motion of the drive element, the tensioning members and the gyroscopic stabilizing member cause substantially offsetting torque to act on the device. Physical characteristics of the stabilizing member are chosen such that the total moment of momentum vector for the stabilizing member is nearly equal to and opposite the total moment of momentum vector for the tensioning members.

In accordance with further aspects of the present invention, the gyroscopic stabilizing member contacts the rotating surface of a tensioning member so that the rotation of the stabilizing member is caused by this contact.

In accordance with other aspects of the present invention, the gyroscopic stabilizing member contancts the rotating surface of a tensioning member so that the rotation of the stabilizing member is caused by this contact.

In accordance with other aspects of the present invention, a damping member is mounted on a free-floating tensioning device. The damping member is made up of a damping material and a device for containing the material relative to the tensioning device. Preferably, the damping member is positioned outside of the loop formed by the drive element so as to be close to the point of maximum amplitude of the motions being damped.

BRIEF DESCRIPTION OF THE DRAWINGS

The foregoing aspects and many of the attendant advantages of the invention will become more readily appreciated as the same becomes better understood by reference to the following detailed description, when takn in conjunction with the accompanying drawings, wherein.

DETAILED DESCRIPTION OF THE PREFERRED EMBODIMENTS

Figure 1:
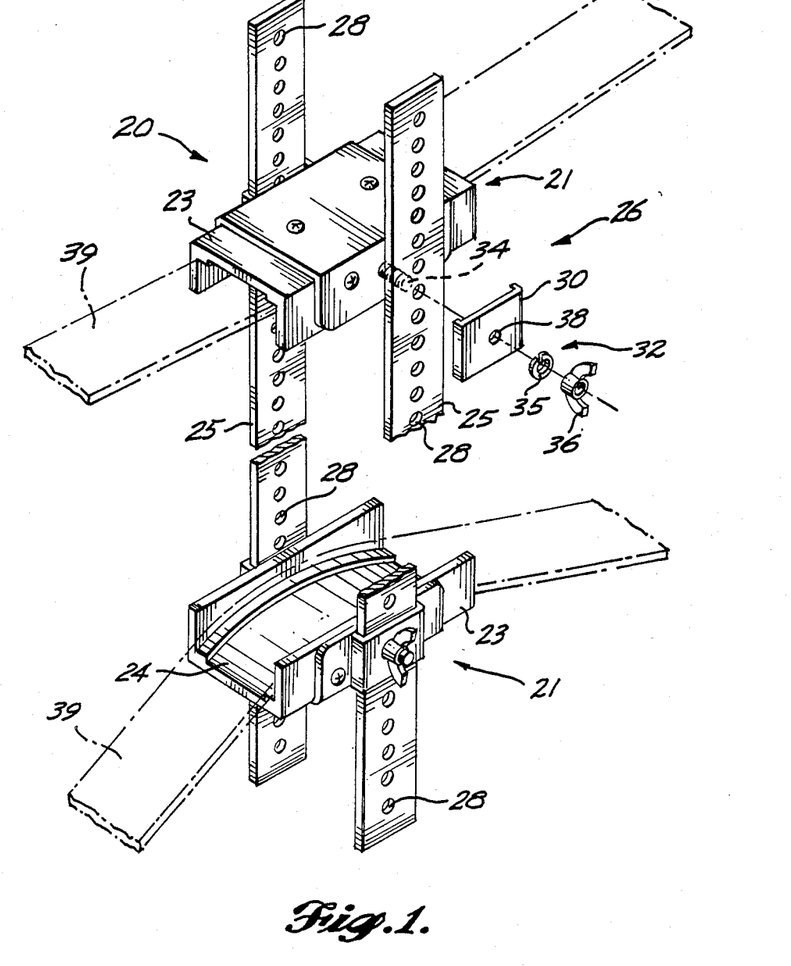
FIG. 1 is an isometric view of a free-floating tensioning device, having tensioning members with stationary contact surfaces, with which the damping component of the present invention is useful, the engagement component utilized to position the tensioning member is shown exploded from the tensioning device.
Figure 2:
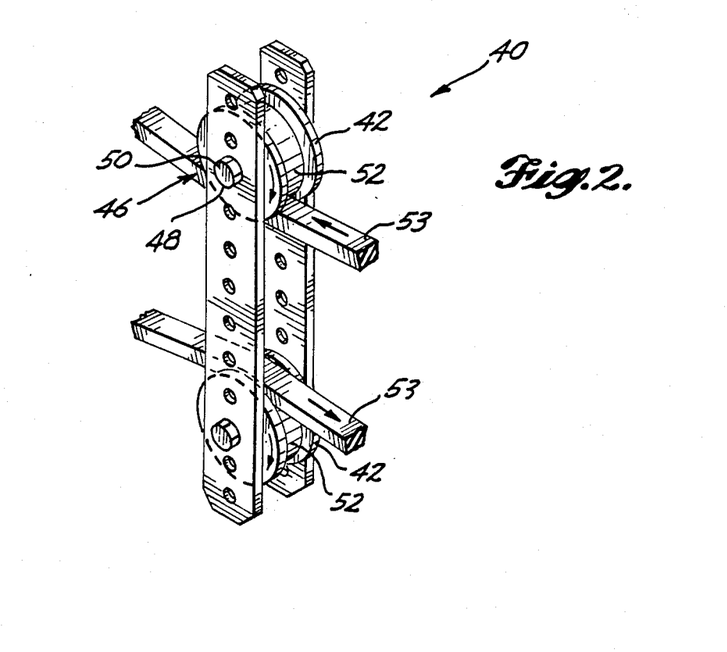
FIG. 2 is an isometric view of a free-floating tensioning device, having tensioning members with rotatable contact surfaces, with which the damping and stabilizing components of the present invention are useful.

With reference to FIGS. 1 and 2, free-floating tensioning devices are used to apply tension to flexible drive element runs. The damping component of the present invention is suitable for use with tensioning devices having these and other configurations. The gyroscopic stabilizing component of the present invention is suitable for use with tensioning devices having tensioning member configurations similar to those of the device shown in FIG. 2. While various tensioning device configurations are illustrated and described herein, where it is appropriate and convenient, equivalent components will be referred to by the same reference number.

The tensioning device 20 of FIG. 1 includes tensioning members 21 that each include a block 23 and a contact surface 24. The tensioning device also includes straps 25 and engagement component 26. The tensioning members are securely fastened between the straps by the engagement component. The engagement component includes a plurality of spaced-apart holes 28 in the straps 25, two pairs of guide plates 30, and a pair of mounting assemblies 32. In one preferred embodiment, each mounting assembly includes bolt 34, washer 35 and nut 36.

To position a tensioning member, a pair of holes 28 are aligned with a bore (not shown) through block 23. Center holes 38 through the guide plates 30 are also aligned with the block bore. Bolt 34 extends through the guide plates, straps, and tensioning member. The washer and nut are tightened onto the extended end of the bolt. The tensioning device is thus mounted on the runs of drive element 39 so that the contact surfaces 24 are opposing one another with the drive element secured therebetween. The position of the tensioning members relative to one another is adjusted using the engagement component to provide adequate operational tension on the drive element.

Alternatively, each mounting assembly 32 includes a pair of projections extending from block 23 perpendicular to the contact surface 24 and two pair of washer and nut sets. On either side of the tensioning member, the projections extend through strap holes 28 and guide plates 30 and are each secured by a washer and nut set. In an additional alternative embodiment, the guide plates 30 are an integral part of block 23. Te straps 25 are then inserted between the guide plate and block to the desired position. Other attachment configurations will be discussed below.

The contact surface 24 of each tensioning member 21 is stationary in relation to the related block 23. Tensioning device 20 is useful for drive systms utilizing chain or belt drive element runs. The tensioning members place adequate pressure on the drive elements to take up slack in the drive element. The contact surfaces are preferably made of a low friction material so that the drive element runs pass smoothly along the contact surface. This drive element to surface material relationship prevents the build-up of excess heat in the system. During operation of the drive system, such a tensioning device is subject to a vibration and/or oscillation, especially during the start-up. The vibration and/or oscillation are caused by belt irregularities and machine vibrations. Additional sources for perturbing the stable operation of the tensioning device are the operating load variations on the belt. In certain drive system applications, the system drives a nonuniform system such as a sawmill. The load on the drive element will vary depending on the operating status of the system. With the addition of a damping component on the tensioning device, these undesirable motions are reduced.

With reference to FIG. 2, tensioning device 40 has tensioning members 42, straps 25 and engagement component 46. The tensioning members are secured between straps 25 by engagement component 46. The engagement component includes a plurality of spaced-apart holes 28 and mounting assembly 48. The mounting assembly includes pin 50, and clamps (not shown). Pin 50 is inserted through an axial bore (not shown) in the tensioning member. The pin is secured by the end clamp. The position of the tensioning members along the straps is adjustable by repositioning one or both of the tensioning members along the length of the straps.

The tensioning members 42 each includes contact surface 52. The contact surfaces are rotatable about the respective tensioning member axis. The rotation of the tensioning members 42 is caused by contact between the contact surfaces and the drive element runs 53. The angular velocity of each tensioning member is thus related to the velocity of the drive element. During operation the tensioning members 42 rotate in the direction indicated. The rotation of the tensioning members creates a moment of momentum vectors normal to the direction of the drive element runs. The motion of tensioning device 40 in directions not substantially parallel to the drive element causes gyroscopic torque to be developed from the tensioning members. The torque acts on the tensioning device. To counteract the gyroscopic torque acting on the tensioning device, a gyroscopic stabilizing component is added to the tensioning device.

Figure 3:
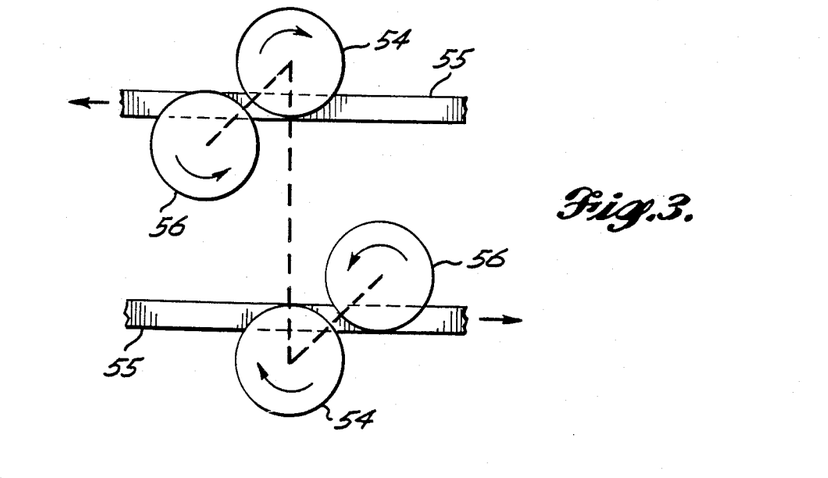
FIG. 3 is a line drawing illustrating the rotation of tensioning members and gyroscopic stabilizing components of a tensioning device of the present invention.

With reference to FIG. 3, tensioning elements 54 represent a pair of tensioning members in contact with a drive element 55. Stabilizing elements 56 represent gyroscopic stabilizing components that contact the sides of the drive element runs opposite the sides contacted by the tensioning elements. The rotation of each element is driven by contact with the drive element. The rotations of tensioning elements 54 are contrasted with the counterrotations of stabilizing elements 56. The action of stabilizing elements 56 counteracts the gyroscopic torque generated by the tensioning elements. Under optimal conditions, the moment of momentum vector is the product of the mass moment of inertia about the axis of rotation and the corresponding angular velocity ($H=I\omega$). Thus, the mass and radii of the stabilizing elements are chosen such that the moment of momentum vector for the stabilizing elements is nearly equal to the moment of the momentum vector for the tensioning elements.

Since, in this instance, the moment of momentum vectors are free vectors in the system, alternative methods can be used for driving the rotation of the stabilizing elements 56. In general, the characteristics of the stabilizing elements—mass, radii, and angular velocities—are chosen to counteract the gyroscopic torque resulting from perturbation of the tensioning members. A tensioning device may include one or more distinct stabilizing elements provided that the set of elements create the desired stabilizing torque.

Figures 4, 5, 6:
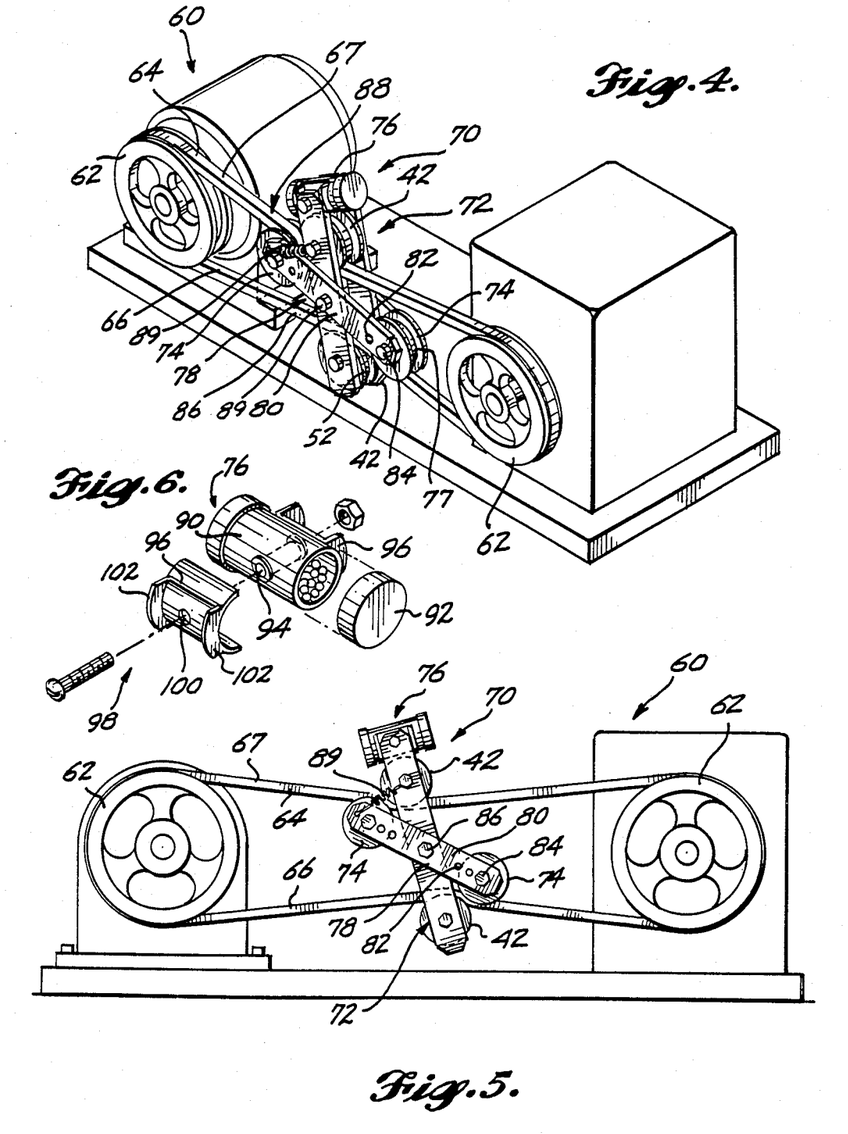
FIG. 4 is an elevated view of one embodiment of the tensioning device of the present invention with a damping component and duo-surface stabilizing component.
FIG. 5 is a side view of the tensioning device illustraed in FIG. 4.
FIG. 6 is a partially exploded isometric view of one embodiment of t he damping component of the tensioning device of the present invention.

With reference to FIGS. 4 and 5, drive system 60 includes drive sprockets 62, and drive element 64. The drive element includes inner surface 66 and outer surface 67. Tensioning device 70 is mounted in a free-floating manner on drive element 64. The tensioning device includes engagement component 72, tensioning members 42, counterrotating members 74 and damping member 76. Each counterrotating member includes contact surface 77.

The engagement component 72 is similar to engagement component 46 discussed above with reference to FIG. 2. The tensioning members 42 are thus secured between straps 25 by a mounting assembly 48. The engagement component additionally includes counterrotation engagement component 78. The counterrotation engagement component preferably includes straps 80 with holes 82, idler mounting assemblies 84, center mounting assembly 86, and adjustment mechanism 88.

The counterrotating members 74 are secured between straps 80 by idler mounting assemblies 84 positioned at the ends of the straps. The idler mounting assemblies 84 are similar to mounting assemblies 48. The position of the counterrotating members relative to one another is altered by adjusting the position of one or both of the members along the length of straps 80.

Straps 80 are secured to the straps 25 by center mounting assembly 86 which is similar to mounting assembly 48. A pair of holes 28 are aligned with a pair of holes 82. Each hole pair is approximately centered along its respective strap between the tensioning or counterrotating member pairs. The pin of the center mounting assembly is inserted through the hole pairs and is secured. In this embodiment, the straps 80, once secured are rotatable relative to the straps 25 about an axis defined by the center pin.

The purpose of the adjustment mechanism 88 is to ensure adequate but nonrigid contact between the counterrotating member contact surfaces 77 and the inner surface 66 of the drive element. The adjustment mechanism 88 includes a pair of springs 89. Each spring is attached to a strap 80 and a strap 25. The springs are mounted on opposite sides of the drive element. One end of each spring is secured at the mounting assembly 48 with the second end secured at a hole 82 in strap 80. The adjustment mechanism and center mounting assembly allow the counterrotating engagement component to rotate about the axis defined by the center pin if adequate force is applied to the contact surfaces 52 and/or the contact surfaces 77 to force the surfaces apart. Thus, if irregularities in operation occur such as foreign materials adhering to the drive element runs the drive element will not be caught in the tensioning device and operation of the drive system should not be interrupted.

In this embodiment, the rotation of the tensioning members and counterrotating members is driven by the drive element during operation of the drive system. The mass and radii of the counterrotating members are chosen so that the moment of momentum vector creating by the counterrotating members is equal and opposite to the moment of momentum vector created by the tensioning members.

The configuration of the tensioning device 70 is useful on drive systems utilizing conventional V-belts or other types of belts having that relatively inner and flat outer surface. The configuration of the counterrotating member contact surface 77 conforms to the inner surface of the drive element. For example, if a V-belt is utilized, the configuration of the counterrotating member contact surface 77 includes a V-belt groove to accommodate the inner surface.

With reference to FIG. 6, the damping member 76 includes a cylindrical container 90. The container preferably includes a removable end 92, central bore 94, cradles 96 and mounting assembly 98. Each semicircular cradle includes bore 100 and end flanges 102. Each cradle partially wraps around the container so that the bores 100 are aligned on either side of the central bore 94. The dampening member is then positioned between straps 25 such that bores 100 and 94 are aligned with a pair of holes 28. The mounting assembly 98 secures the damping member between the straps. The end flanges 102 secure the cradle about an axis defined by the pin so that the damping member does not rotate relative to the straps 25. It is preferable to position the damping member at the maximum amplitude of the motions which it is meant to damp. Thus, one preferred position for the damping member is at either end of the straps 25, i.e., outside of the loop formed by the drive element.

The damping member includes a damping material. The container 90 is filled with damping material which is secured within the container by end 92. Preferable damping materials are reacting formed objects such as spherical lead shot or ball bearings, granular media such as sand or metal chips, or liquids such as oil, water, or silicon fluid. Alternatively, some combination of these materials may be used. The damping material acts against itself and against the walls of the container to create loss sufficient to control the unwanted motions of the tensioning device during operation of the drive system. The use of a combination of fluid and solid damping material increases the life of the damping member by preventing deterioration of the particles and container through wear and erosion. The choice of container material influences damping capabilities, life of the damping member, and side effects such as noise generation. When a metallic material is used for the container, a combination of fluid and solid damping materials also controls noise effects. Further, the sensitivity of the damping member to temperature increases as the amount of fluid material used in the member is increased. The specific damping and container structural material used vary with the environment in which the tensioning device is to be used.

Figures 7, 8, 9:
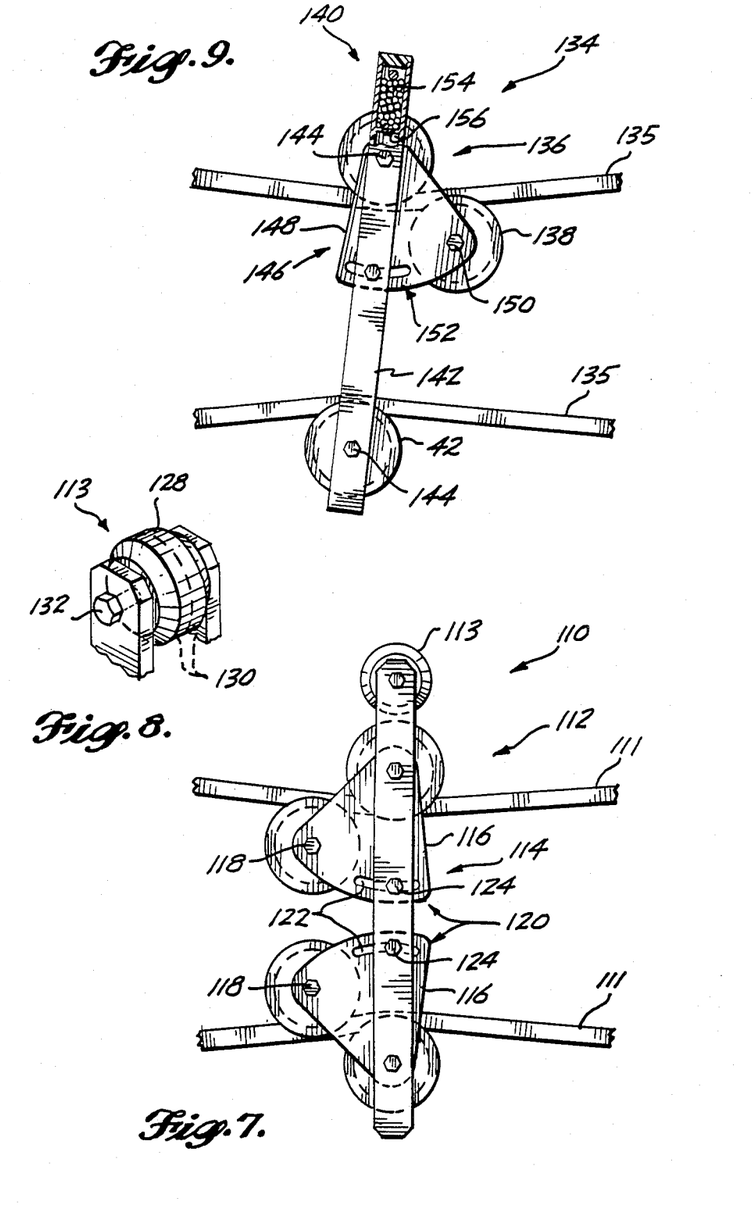
FIG. 7 is a side view of one embodiment of the tensioning device of the present invention having a damping component and duo-surface gyroscopic stabilizing component.
FIG. 8 is an isometric view of an alternative embodiment of the damping component of the tensioning device of the present invention.
FIG. 9 is a side view of one embodiment of the tensioning device of the present invention having the damping component contained within the engagement means, and having a single-surface gyroscopic stabilizing component.

With reference to FIG. 7, an alternative preferred embodiment of the tensioning device 110, mountable on drive elements 111, includes engagement component 112, tensioning members 42, counterrotating members 74 and damping member 113. As with previously described embodiments, the tensioning members 42 are secured over between straps 25 by mounting assembly 48.

The engagement component 112 also includes counterrotating engagement component 114. The counterrotating engagement component includes two pairs of engagement plates 116, idler mounting assemblies 118, and adjustment mechanism 120. Each counterrotating member is secured between a pair of engagement plates 116 by means of an idler mounting assembly 132. The pin of each mounting assembly extends through holes (not shown) in the plates and through an axial bore in the counterrotating member and is there secured. Each pair of engagement plates is secured between the straps 25 by a mounting assembly 48. The pin of the mounting assembly 48 extends through a hole (not shown) in the engagement plate to secure each plate between a strap 25 and the tensioning member.

The adjustment mechanism 120 includes plate channels 122 and adjustment mounting assemblies 124. The pin of the adjustment mounting assembly extends through a strap 25, through channels 122 in a pair of plates, and through the opposing strap. The pin is then secured. The positions of the counterrotating members relative to the tensioning members are thus adjustable by rotating the corresponding engagement plates about the pins in mounting assemblies 48. In t his embodiment, the rotation of the counterrotating members is driven by the inner surface 66 of the drive element as it contacts the counterrotating member contact surfaces 77 during operation of the drive system.

With reference to FIG. 8, an alternative preferred damping member 113 includes a spherical container 128. The container includes hemispheres 130 each having a bore (not shown) therethrough, and a mounting assembly 132. The hemispheres are filled with damping material, mounted between the straps, and held together by the mounting assembly. The pin of the mounting assembly extends through the container bore. Alternatively, each hemisphere 130 includes threaded central edges (not shown) configured so that the container is screwed together after the damping materials are placed in one or both hemispheres. In this embodiment, the hemispheres are filled, screwed together, and then mounted between straps 25.

With reference to FIG. 9, an alternative embodiment of tensioning device 134, mountable on drive element 135, includes engagement component 136, tensioning members 42, counterrotating member 138, damping member 140 and tubes 142. The engagement component 136 includes mounting assemblies 144, and a counterrotating engagement component 146. The counterrotating engagement component includes a pair of engagement plates 148, mounting assembly 150, and an adjustment mechanism 152. The tensioning members and counterrotating member are positioned in a manner similar to that described above with reference to FIG. 7. However, the tensioning members and the counterrotating engagement component are secured to tubes 142 rather than to straps. Additionally, only a single counterrotating member 138 and engagement plate pair 148 are used.

The damping member 140 includes damping materials 154, and tube stops 156 for securing the damping materials within the ends of the tubes. In one preferred embodiment, each tube stop is positioned in a tube so that the damping material is held in the tube beyond the loop formed by the drive element. In this manner, the damping materials are positioned at the maximum amplitude of the motions which they are meant to damp, and thus provide an efficient means for damping the system. Preferably, the tube stops in each of the tubes 142 are positioned at equivalent points along the lengths of the tubes such that the damping material is held symmetrically about a line between the centers of the drive element runs.

Figures 10, 11:
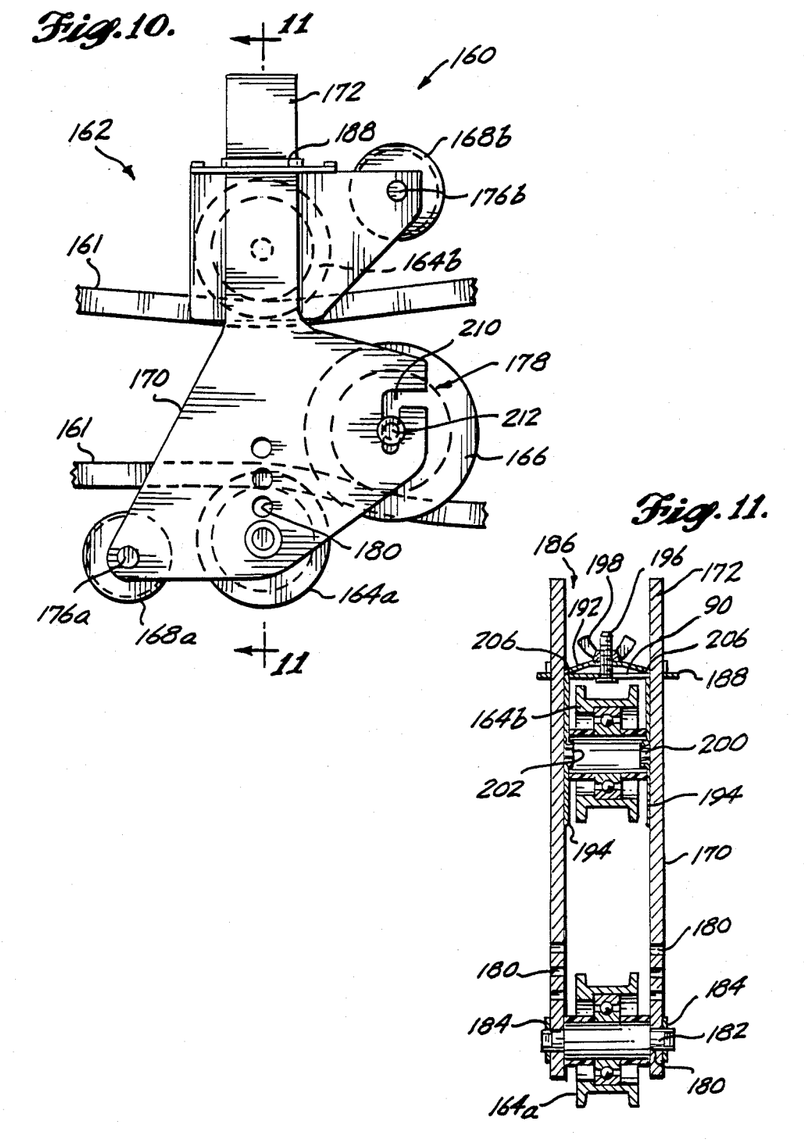
FIG. 10 is a side view of one embodiment of the tensioning device of the present invention having two damping components and a single-surface gyroscopic stabilizing component.
FIG. 11 is a front view, cut along the line 11—11 of FIG. 10, of one engagement means suitable for use with the present invention.

With reference to FIG. 10, the tensioning device 160, mountable on drive element 161, includes engagement component 162, tensioning members 164a and 164b, counterrotating member 166, damping members 168a and 168b, and side pieces 170 with extensions 172. The engagement component 162 includes damping mounting assemblies 176a and 176b, and adjustment mechanism 178.

With reference to FIG. 11, the engagement component 162 includes holes 180 in the side sections, threaded projections 182, nuts 184, and ratchet mechanism 186. The projections 182 extend from tensioning member 164a and through a pair of holes 180. The projections are secured by nuts 184. The position of tensioning member 164a is adjustable to the extent of the presence of holes 180.

The ratchet mechanism 186 includes guides 188, cross piece 190, bow piece 192, inner plates 194 which are right angle extensions of cross piece 190, bolt 196, and nut 198. Additionally, the ratchet mechanism includes serrations along the inside of extensions 172. The serrations generally run along lines parallel to the direction of the drive element.

Inner plates 194 include opposing projections 200 which project towards one another at right angles to the plates. The projections extend into axle bores 202 of tensioning member 164b. Once the tensioning member 164b is secured between the inner plates, the ratchet mechanism is positioned between side pieces 170 so that the drive element runs lie between the tensioning members. To attach the ratchet mechanism, the extensions 172 are inserted through guides 188 which lie on either side of the ratchet mechanism. The ratchet mechanism is then slid towards the tensioning member 164a along the extensions.

The cross piece 190 and the bow piece 192 include bores (not shown) th rough which the bolt 196 is inserted. As the nut 198 is tightened onto the bolt, the edges 206 of the bow piece are forced against the cross piece. The resistance of the cross piece forces the edges outwardly so as to contact the side pieces 170. The side pieces are held in place by the guides 188 so that they are not displaced outwardly under the pressure from the edges 206. The edges are each caught in a serration along the inside of the side pieces, thus securing the position of tensioning member 164b relative to the side pieces. The position of tensioning member 164b is adjustable to the extent of the presence of the serrations along the side piece extensions.

The counterrotating member 166 is secured between side pieces 170 by adjustment mechanism 178. The adjustment mechanism includes L-channels 210 in each side piece and mounting assembly 212. The pin from the mounting assembly is inserted through a bore along the axis of the counterrotating member and slidably mounted within the channels. When the desired position of the counterrotating member relative to the tensioning member 164a is achieved, the pin is secured. Counterrotating member 166 is sized and positioned so as to balance the gyroscopic torque produced by the tensioning members during operation of the drive system.

The damping member 168a is fixed between the side pieces by damping mounting assembly 176a. Damping member 168b is similarly fixed between inner plates 194 by damping mounting assembly 176b. The damping members 76 and 113, illustrated in FIGS. 6 and 8, respectively, are both suitable for use with this tensioning device.

The ratchet mechanism and adjustment mechanism provide for easy assembly of the tensioning device on the drive element. To attach the tensioning device, tensioning member 164a and damping member 168a are fixed between the side pieces 170. The tensioning device is then positioned with the drive element runs between the side pieces. Tensioning member 164b and damping member 168b are secured between the inner plates 194 of the ratchet mechanism 186. The ratchet mechanism is mounted between the side pieces by insertion of the side piece extensions 172 through the guides 188. The tensioning member 164b is slid into position relative to tensioning member 164a to provide adequate tension on the drive element runs. The ratchet mechanism is then tighetened to stabilize the position of tensioning member 164b. The counterrotating member 166 is then positioned and secured between the side pieces so that the contact surface of the counterrotating member contacts the adjacent drive element run. Because of the adjustment mechanism, the drive element runs do not have to be threaded between tensioning member 164a and counterrotating member 166 in order to attach the tensioning device to the drive element.

Figure 12:
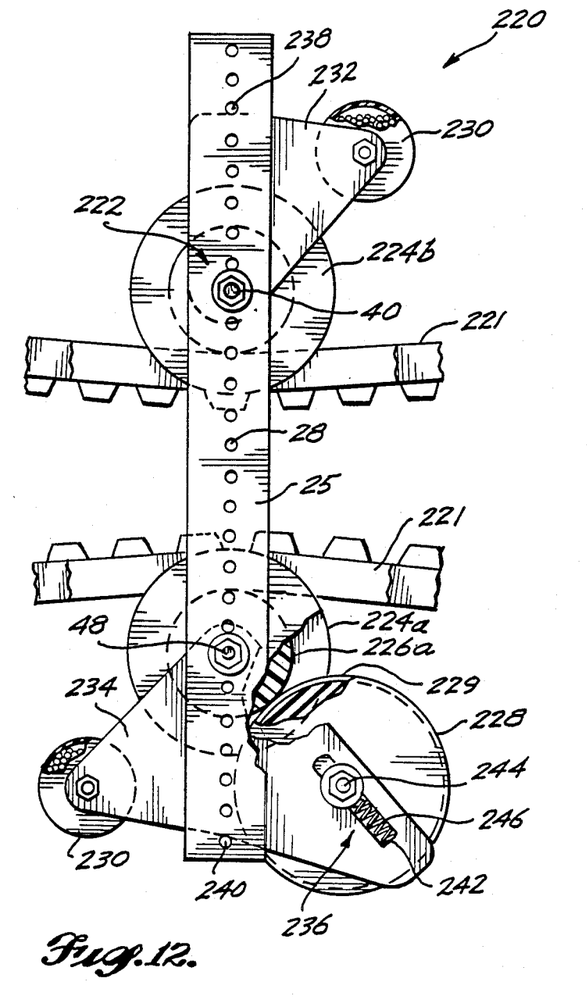
FIG. 12 is a side view of one embodiment of the tensioning device of the present invention having two damping components and a single-surface gyroscopic stabilizing component.

With reference to FIG. 12, a tensioning device 220 suitable for use in a drive system that utilizes a drive element 221 such as high torque drive (HTD) belts, flat geared belts, poly V-belts, etc., includes engagement component 222, tensioning members 224a and 224b having contact surfaces 226a and 226b, respectively, counterrotating member 228 having contact surface 229, damping members 230 and straps 25. Drive systems utilizing these type of drive elements depend on teeth, ridges, etc., along the drive element inner surface to carry the load of the drive system. The drive pulleys of these types of drive systems are configured so that the inner belt surfaces catch on the pulleys and cause the drive element to be pulled around. The irregularity of the inner surface of the drive element makes it difficult to use the inner surface of the drive element to power the rotation of the counterrotating member. In this embodiment, the rotation of the counterrotating member 228 is driven by contact between the counterrotating contact surface 229 and contact surface 226a.

The engagement component 222 includes mounting assemblies 48, upper plates 232, lower plates 234, and adjustment mechanism 236. The tensioning members 224 are secured between the straps in a manner similar to that described with reference to the tensioning device of FIG. 2. The upper pair of plates 232 are secured at one point between the straps on either side of the tensioning member 224b by means of the mounting assembly used to secure the tensioning member between the straps. The plates include tabs 238 that are positioned within a strap hole 28 to secure the plates at second points so that the plates will not rotate about the mounting assembly. The lower pairs of plates 234 are similarly positioned between each strap on either side of the tensioning member 224a. Tabs 240 are inserted mounting assembly 244 and springs 246. The pin of the mounting assembly extends through the channels in the lower plates and through an axial bore in the counterrotating member. The pin is secured between the plates by the remainder of the mounting assembly. The contact surface 229 of the counterrotating member contacts the contact surface 226a of the tensioning member 224a. In this manner, the rotation of the counterrotating member is driven by the tensioning member. The position of the counterrotating member is adjustable by the movement of the mounting assembly against the springs 246. Thus, if, during operation, some irregularity arises and is related to contact surface 226a on the drive element, the counterrotating member 228 is able to deflect away from tensioning member 224a. This prevents damage to the tensioning device and the drive system.

The damping members 230 are mounted between the upper and lower plates. Any suitable damping member attached by methods described above will damp the undesired motions.

While several preferred embodiments of tensioning devices have been described, it is to be understood that various modifications to the invention are available. For example, combinations of the various gyroscopic stabilizing members and damping members described will provide a stabilizing system for a specific drive system. Additionally, a variety of means for positioning the tensioning, counterrotating, and damping members have been described and are interchangeable.

While tensioning devices having rotatable tensioning members are illustrated, it is to be understood that the damping members are equally effective on tensioning devices having tensioning members with contact surfaces that are stationary relative to the tensioning members such as those discussed with reference to FIG. 1. In such a tensioning device, one damping component suitable for damping the undesirable motions of the device is included in the blocks of the tensioning members.

The contact surfaces of the counterrotating gyroscopic stabilizing members have generally been described as smooth surfaces. Alternatively, the surfaces can be convex, concave, ribbed, or coated with some other material. Generally, when the rotation of the counterrotating member is driven by the contact at its contact surface with some other element, the contact surface configuration is chosen to make the contact smooth while providing adequate friction. For example, with reference to FIG. 12, a counterrotating member having a suitably slotted surface would lie between the drive element runs. The rotation of the counterrotating member would be driven by contact with toothed side of the drive element.

The counterrotating gyroscopic stabilizing members have generally been described as rotatable idlers. A variety of idler configurations are useful in the present invention. As noted, one of the characteristics of the counterrotating members that is important is the mass of the member. In order to add mass without increasing the radius of a member, weight can be added to the side of the member in a manner that is symmetrical about the drive element. It is also to be understood that any rotating mass that producesthe requisite moment of momentum vector will perform the necessary function. Additionally also be suitable for use with the present tensioning device.

The embodiments of the invention in which an exclusive property or privilege is claimed are defined as follows:

1. A tensioning device for a drive system having a flexible drive element mounted on drive sprockets, the tensioning device comprising:

a free-floating tensioning assembly including, a first tensioning member having a first contact surface; a second tensioning member having a second contact surface; and positioning means for securing said first and second tensioning members a selected distance away from one another such that said first and second contact surfaces are spaced apart from and facing one another and apply a suitable tensioning force to the drive element; and damping means connected to said tensioning assembly for damping the motion of the tensioning device.

2. The tensioning device as claimed in claim 1, wherein said positioning means includes a pair of mounting members extending between said first and second tensioning members, first engagement means for connecting said tensioning members to said mounting members, and damping engagement means for securing said damping means to the device.

3. The tensioning device as claimed in claim 2, wherein said mounting members include straps and said damping means is secured between said straps.

4. The tensioning device as claimed in claim 3, wherein said damping engagement means lies outside the loop formed by the flexible drive element.

5. The tensioning device as claimed in claim 3, wherein said damping means includes a container filled with a damping material.

6. The tensioning device of claim 5, wherein said container is comprised of two connectable side pieces, and wherein said damping engagement means includes means for securing said side pieces together.

7. The tensioning device as claimed in claim 2, wherein said mounting members include tubes, said damping means includes damping material, and said damping engagement means secures said damping material within said tubes.

8. The tensioning device as claimed in claim 7, wherein said damping engagement means includes tube stops positioned within said tubes, and said tube stops are positioned relative to the flexible drive element such that the majority of said damping material lies outside the loop formed by the flexible drive element.

9. The tensioning device as claimed in claim 1, wherein said tensioning members include damping engagement means for securing said damping means to the device.

10. The tensioning device of claim 1, wherein said damping means includes damping material such as reacting formed objects, granular media, liquids, or a combination of said materials.

11. A tensioning device for a drive system having a drive element mounted on drive sprockets, the tensioning device comprising:

a free-floating tensioning assembly including, a first tensioning member having a first rotatable contact surface, a second tensioning member having a second rotatable contact surface, the axes of rotation of said contact surfaces being generally parallel to one another, and positioning means for securing said first and second tensioning members a selected distance away from one another such that said first and second contact surfaces are spaced apart from and facing one another, and apply a suitable tensioning force to the drive element; and stabilizing means secured to the tensioning device by said positioning means for creating a stabilizing torque that is substantially equal and opposite to the gyroscopic torque created by said tensioning members, whereby the gyroscopic torque on said tensioning device during operation is limited.

12. The tensioning device as claimed in claim 11, wherein said stabilizing means includes a counterrotating member.

13. The tensioning device as claimed in claim 12, wherein said positioning means includes a pair of mounting members extending between said first and second tensioning members, first engagement means for connecting said tensioning members to said mounting members, and counterrotating engagement means for connecting said counterrotating member to said mounting members.

14. The tensioning device as claimed in claim 13, wherein said counterrotating engagement means includes means for adjusting the position of said counterrotating member relative to said tensioning members.

15. The tensioning device as claimed in claim 14, wherein said counterrotating member is positioned outside the loop formed by the flexible drive element.

16. The tensioning device as claimed in claim 14, wherein said counterrotating member is positioned inside the loop formed by the flexible drive element.

17. The tensioning device as claimed in claim 12, wherein said counterrotating member includes a counterrotatable contact surface.

18. The tensioning device as claimed in claim 17, wherein said counterrotating member is caused to rotate by means of contact between said counterrotatable contact surface and said first or second rotatable contact surfaces.

19. The tensioning device as claimed in claim 17, wherein said counterrotating member is caused to rotate by means of contact between said counterrotatable contact surface and a surface of the drive element.

20. The tensioning device as claimed in claim 11, wherein said stabilizing means includes a plurality of counterrotatable members, whereby the total stabilizing torque created by said counterrotating members is substantially equal and opposite to the total gyroscopic torque created by said tensioning members.

21. The tensioning device as claimed in claim 11, wherein said stabilizing means includes a counterrotatable mass, and wherein the tensioning device further includes power means for rotating said counterrotatable mass such that the stabilizing torque created by said counterrotating mass is substantially equal and opposite to the total gyroscopic torque created by said tensioning members.

22. A tensioning device for a drive system having a flexible drive element mounted on drive sprockets, the tensioning device comprising:

a free-floating tensioning assembly including, a first tensioning member having a first rotatable contact surface, a second tensioning member having a second rotatable contact surface, the axes of rotation of said contact surfaces being generally parallel to one another, positioning means for securing said first and second tensioning members a selected distance away from one another such that said first and second contact surfaces are spaced apart from and facing one another and apply a suitable tensioning force to the drive element;

damping means secured to said tensioning assembly for damping the motion of the tensioning device; and stabilizing means secured to the tensioning device by said positioning means for applying a stabilizing torque to the tensioning device, said stabilizing torque being substantially equal and opposite to the total gyroscopic torque created by said tensioning members.

* * * * *

UNITED STATES PATENT AND TRADEMARK OFFICE
CERTIFICATE OF CORRECTION

PATENT NO. : 4,850,934            Page 1 of 2

DATED : July 25, 1989

INVENTOR(S) : Gibson, Jr. et al.

It is certified that error appears in the above-identified patent and that said Letters Patent is hereby corrected as shown below:

Title page:

[57] (ABSTRACT), line 9: "elements," should be --element,--

Column 1, line 25: "devicec" should be --devices--

Column 2, line 30: "somewhat" should be --somehow--

Column 2, line 37: "d rive" should be --drive--

Column 2, line 38: after "tensioning" insert --device--

Column 2, line 43: "gyrocopic" should be --gyroscopic--

Column 3, lines 24-28: delete "In accordance with other aspects. . . by this contact." (entire paragraph)

Column 3, line 44: "takn" should be --taken--

Column 3, lines 62-63: "illus-traed" should be --illustrated--

Column 3, line 65: "t he" should be --the--

Column 5, line 1: "Te" should be --The--

Column 5, line 7: "systms" should be --systems--

Column 6, lines 12-13: "velocitie-s" should be --velocities--

Column 6, line 51: "secured" should be --secured,--

Column 7, line 28: "dampening" should be --damping--

Column 8, line 27: "t his" should be --this--

Column 9, line 45: "th rough should be --through--

Column 10, line 24: "tighetened" should be --tightened--

UNITED STATES PATENT AND TRADEMARK OFFICE
CERTIFICATE OF CORRECTION

PATENT NO. : 4,850,934

DATED : July 25, 1989

INVENTOR(S) : Gibson, Jr. et al.

It is certified that error appears in the above-identified patent and that said Letters Patent is hereby corrected as shown below:

Column 11, line 67: "producesthe" should be --produces the--

Signed and Sealed this

Twenty-sixth Day of June, 1990

*Attest:*

HARRY F. MANBECK, JR.

*Attesting Officer*      *Commissioner of Patents and Trademarks*